US009462379B2

(12) United States Patent
Ivanov et al.

(10) Patent No.: US 9,462,379 B2
(45) Date of Patent: Oct. 4, 2016

(54) METHOD AND APPARATUS FOR DETECTING AND CONTROLLING THE ORIENTATION OF A VIRTUAL MICROPHONE

(71) Applicant: Google Technology Holdings LLC, Mountain View, CA (US)

(72) Inventors: Plamen A Ivanov, Schaumburg, IL (US); Rivanaldo S Oliveira, Grayslake, IL (US); Robert A Zurek, Antioch, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 513 days.

(21) Appl. No.: 13/946,150

(22) Filed: Jul. 19, 2013

(65) Prior Publication Data
US 2014/0270248 A1    Sep. 18, 2014

Related U.S. Application Data

(60) Provisional application No. 61/827,722, filed on May 27, 2013, provisional application No. 61/776,793, filed on Mar. 12, 2013, provisional application No. 61/798,097, filed on Mar. 15, 2013.

(51) Int. Cl.
*H04R 3/00* (2006.01)
*H04M 1/60* (2006.01)

(52) U.S. Cl.
CPC ............ *H04R 3/005* (2013.01); *H04M 1/605* (2013.01); *H04R 2499/11* (2013.01)

(58) Field of Classification Search
CPC ... H04R 3/005; H04R 2499/11; H04M 1/605

USPC ............................................ 381/92, 313, 56
See application file for complete search history.

(56) References Cited

U.S. PATENT DOCUMENTS 8,781,142 B2 * 7/2014 Olafsson et al. ............. 381/313
2009/0209293 A1    8/2009 Louch
(Continued)

FOREIGN PATENT DOCUMENTS

| EP | 2 278 356 | 1/2011 |
|---|---|---|
| EP | 2 469 828 | 6/2012 |
| WO | 2006/027707 | 3/2006 |

OTHER PUBLICATIONS

International Preliminary Report on Patentability is International Application No. PCT/US2014/014073, mailed Sep. 24, 2015, 16 pages.
(Continued)

*Primary Examiner* — David Ton
(74) *Attorney, Agent, or Firm* — Fish & Richardson P.C.

(57) ABSTRACT

A method for controlling the orientation of a virtual microphone, which is carried out on an electronic device, includes combining and processing signals from a microphone array to create a virtual microphone; receiving data from a sensor of the electronic device; determining, based on the received data, a mode in which the electronic device is being used; and based on the determined mode, directionally orienting the virtual microphone. Possible use modes include a) a stowed use mode, in which the criterion is the electronic device being substantially enclosed by surrounding material; b) a handset (alternately, private) use mode, in which the criterion is the electronic device being held proximate to a user; and c) a handheld (alternately, speakerphone) use mode, in which the criterion is the electronic device being held away from a user.

18 Claims, 5 Drawing Sheets

(56) References Cited

U.S. PATENT DOCUMENTS

| | | |
|---|---|---|
| 2009/0290718 A1 | 11/2009 | Kahn et al. |
| 2010/0026780 A1 | 2/2010 | Tico et al. |
| 2010/0195838 A1 | 8/2010 | Bright |
| 2012/0182429 A1 | 7/2012 | Forutanpour et al. |
| 2013/0034241 A1 | 2/2013 | Pandey et al. |
| 2013/0035040 A1 | 2/2013 | Terlizzi |

OTHER PUBLICATIONS

Emiliano Miluzzo, Pocket, Bag, Hand, etc.—Automatically Detecting Phone Context through Discovery, http://www.cs.dartmouth.edu/~campbell/papers/miluzzo-phonesense.pdf, Mar. 18, 2013, all pages.

International Search Report and Written Opinion in International Application No. PCT/US2014/014073, mailed Jul. 24, 2014, 22 pages.

\* cited by examiner

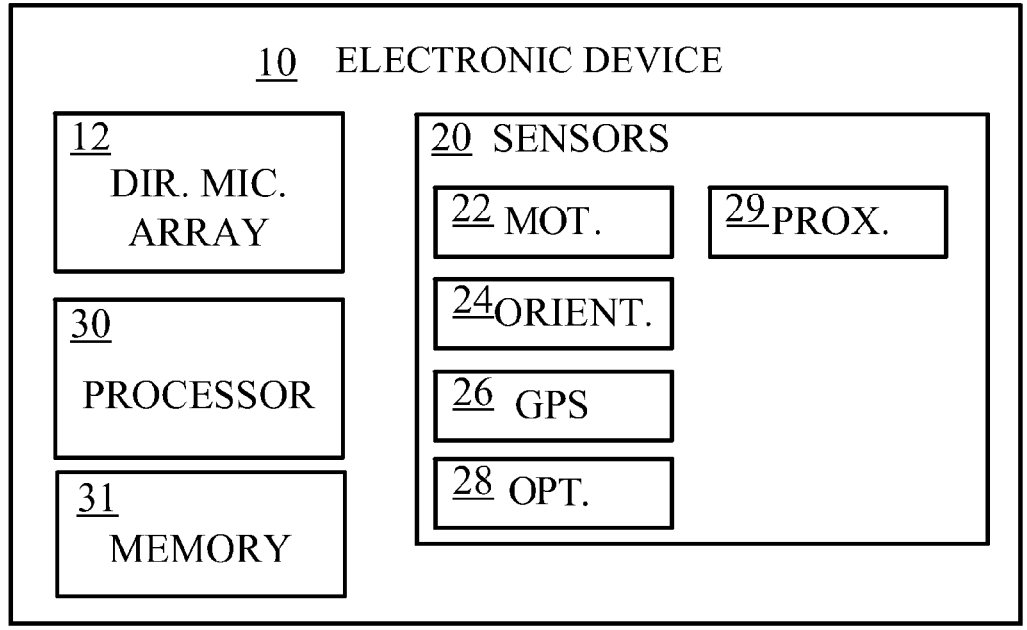
FIG. 1
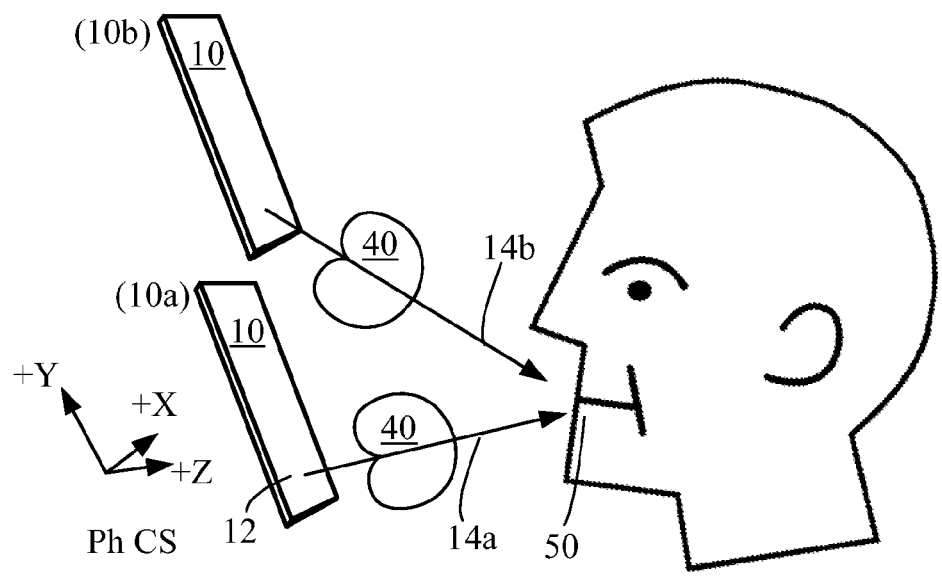
FIG. 2
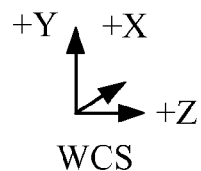

METHOD AND APPARATUS FOR DETECTING AND CONTROLLING THE ORIENTATION OF A VIRTUAL MICROPHONE

CROSS-REFERENCES TO RELATED APPLICATIONS

The present application claims the benefit of the filing date of U.S. Provisional Application No. 61/776,793, filed Mar. 12, 2013; U.S. Provisional Application No. 61/798, 097, filed Mar. 15, 2013; U.S. Provisional Application No. 61/827,722, filed May 27, 2013, the entire contents of which are incorporated by reference.

TECHNICAL FIELD

The present disclosure relates to controlling the orientation of a virtual microphone in an electronic device.

BACKGROUND

It is generally desirable in audio devices to be able to orient the directional gain of a microphone in the direction of a desired source. This permits audio from the desired source to be emphasized and audio from non-desired sources to be de-emphasized. Assuming the microphone has directivity, one way to orient its directional gain is to physically rotate the microphone.

If the audio device has an array of microphones, a signal processor can combine and process audio signals from these microphones so as to emphasize audio signals representing sound from the desired source and de-emphasize audio signals from non-desired sources. This process is referred to as "beam forming." The signal processor can also change the emphasis of the audio signals. This change is referred to as "beam steering." The concepts of beam forming and beam steering can also be expressed by the term "virtual microphone." The "orientation" of the virtual microphone is the direction of the beam, and the processes of "orienting" or "reorienting" the virtual microphone are carried out by beam steering.

The purpose of forming a virtual microphone is to give the physical array directivity (directional sensitivity) or other desirable characteristic. By forming a virtual microphone, the physical microphones need not be physically moved in order to reorient their directional gain. Rather, the virtual microphone is reoriented.

DRAWINGS

While the appended claims set forth the features of the present techniques with particularity, these techniques may be best understood from the following detailed description taken in conjunction with the accompanying drawings of which:

FIG. 1 is a block diagram illustrating the components of an exemplary electronic device.

FIG. 2 is a pictorial diagram illustrating movement of an electronic device relative to a user when operating in a handheld (speakerphone) mode.

Figure 3A:
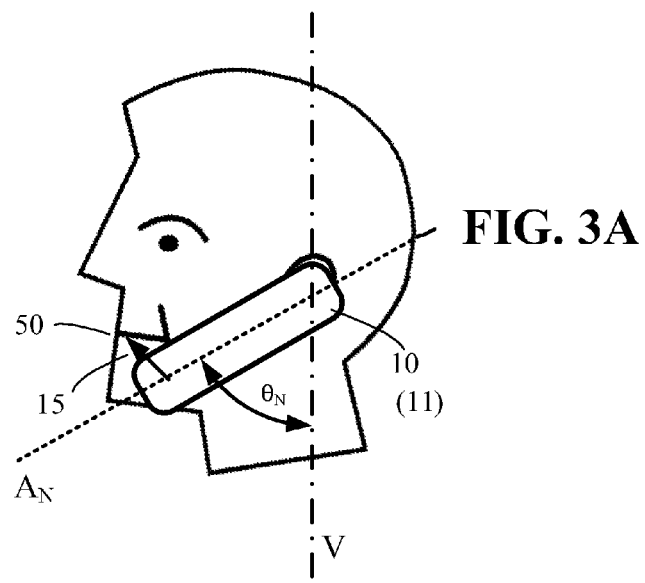
Figure 3B:
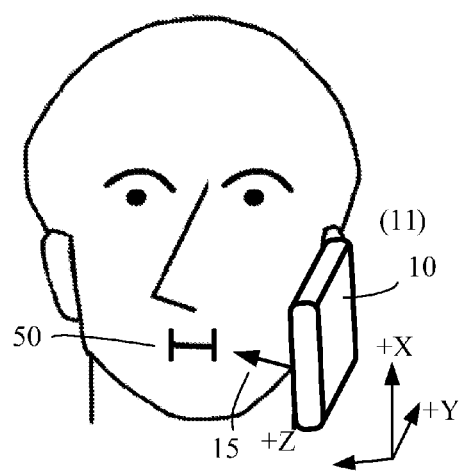
Figure 3C:
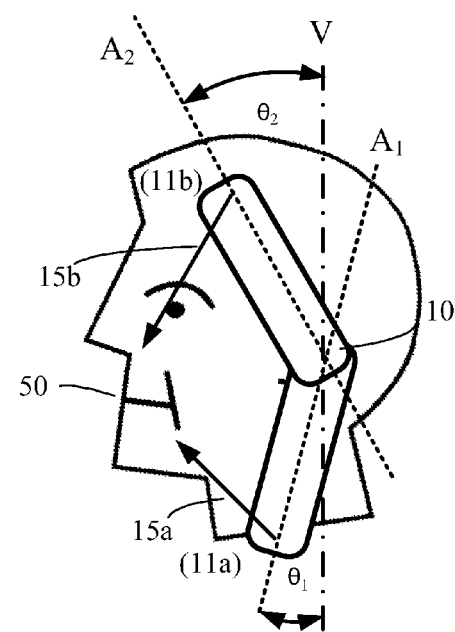

FIGS. 3A-C are pictorial diagrams showing operation of the device in a handset (private) mode.

Figure 4:
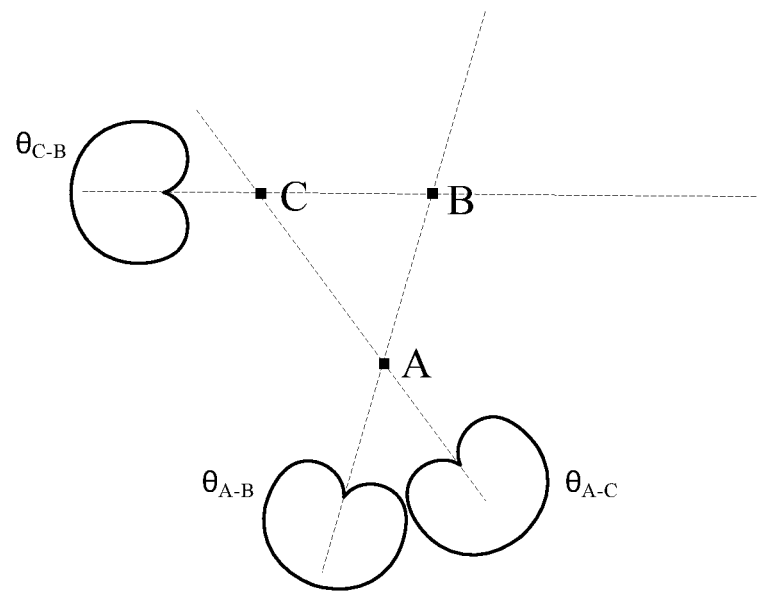

FIG. 4 is a pictorial illustration of a plurality of microphones being combined in a discrete manner.

Figure 5:
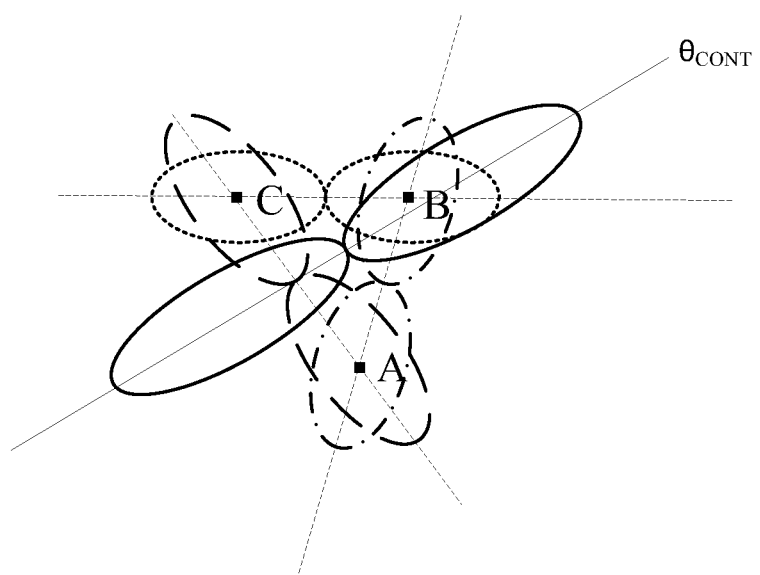

FIG. 5 is a pictorial illustration of a plurality of microphones being combined in a continuous manner.

Figure 6:
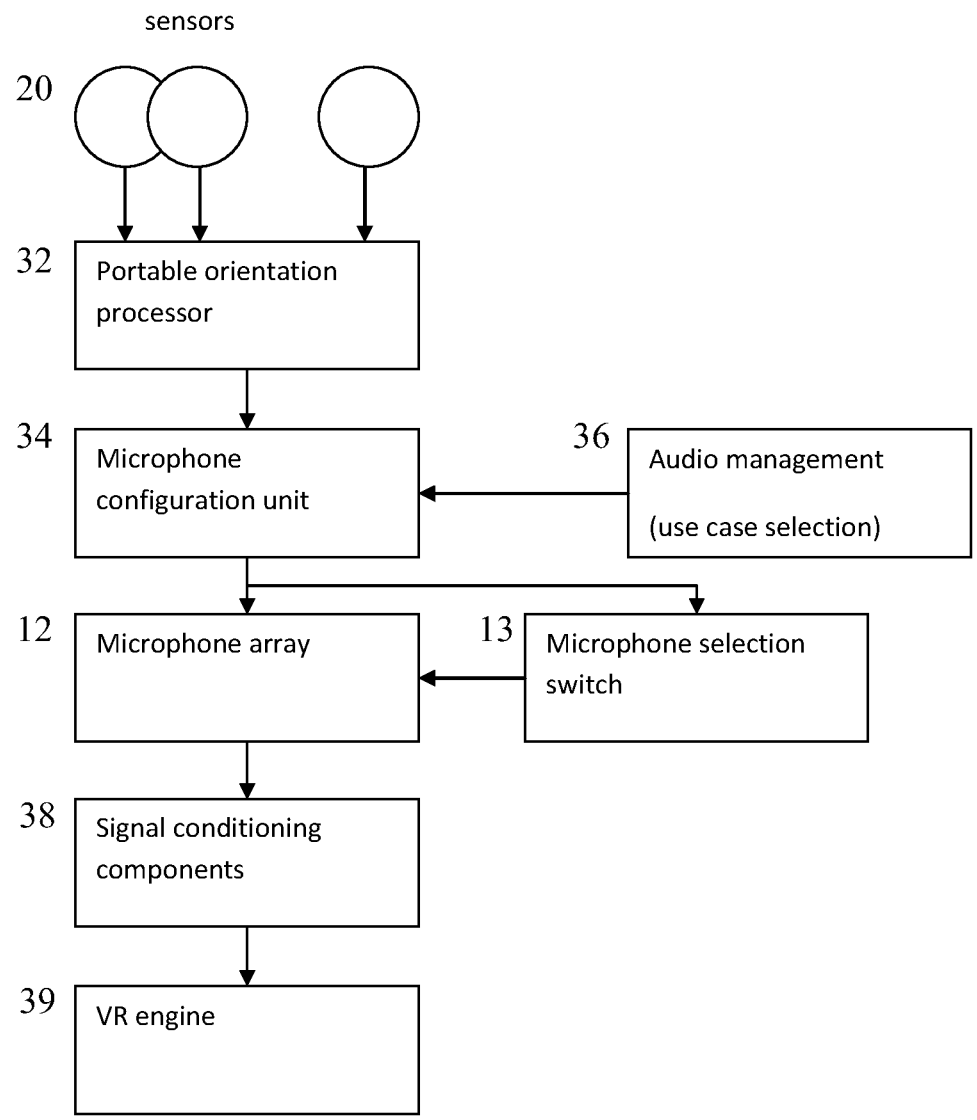

FIG. 6 is a block flow diagram illustrating components of the electronic device and a flow of information from respective components.

Figure 7:
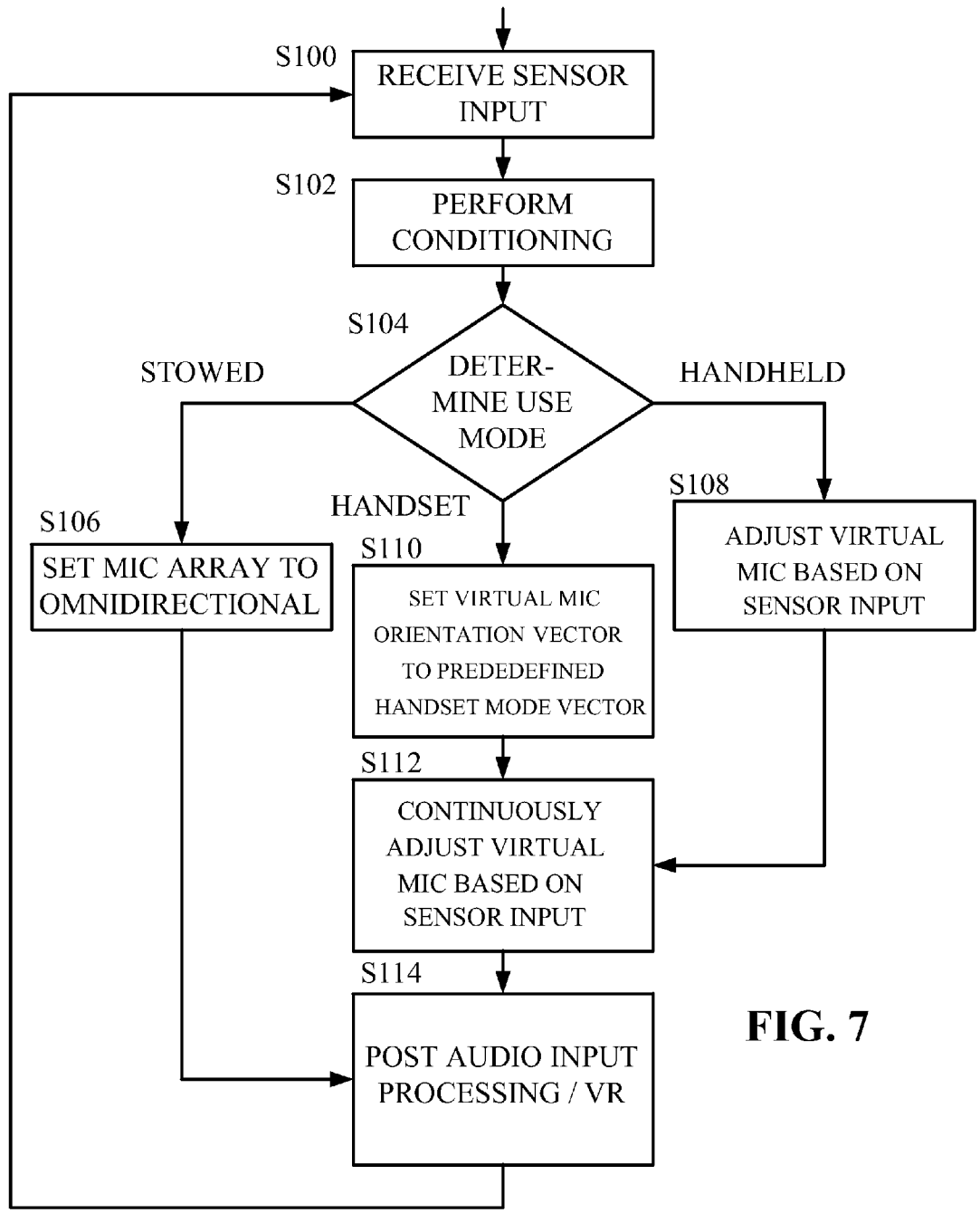

FIG. 7 is a flowchart illustrating an exemplary method implemented by the electronic device.

DESCRIPTION

Traditionally, an audio device having a beam steering capability determines a direction in which to orient a virtual microphone using some characteristic of the audio itself as a factor for determining direction. One common way to do this is for the audio device to locate the highest energy source and orient the virtual microphone towards that source.

One drawback of relying solely on qualities of the audio itself (such as its energy) is that, instead of fixing on the desired source (such as a person speaking), the audio device may wrongly orient the virtual microphone toward an interfering jammer. This is especially true when the audio energy of the jammer is stronger than that of the desired source.

It is not just the audio itself that impacts effectiveness of beamforming, however. The orientation of the audio device relative to the source of the desired sound also influences the quality of the desired audio signal. Furthermore, the orientation of the audio device influences the quality of the signals used to obtain noise estimates (when, for example, noise suppression is used as a signal conditioning component). When a microphone array is used as part of a noise suppression system (or when used as a pre-processor for voice recognition) the virtual microphone should be oriented so as to optimize the operation of the signal conditioning system and to be as accurate as possible.

Therefore, provided herein is a method for controlling the orientation of a virtual microphone. In one embodiment, the method, which is carried out on an electronic device, includes combining and processing signals from a microphone array to create a virtual microphone; receiving data from a sensor of the electronic device; determining, based on the received data, a mode in which the electronic device is being used; and based on the determined mode, directionally orienting the virtual microphone.

Also provided herein is an electronic device having a microphone array, a sensor, a plurality of microphones, and a processor configured to combine and process signals from the plurality of microphones to create a virtual microphone; determine, using an output of the sensor, a use mode of the electronic device; and orient the virtual microphone based on the determined use mode.

In another embodiment, a method for controlling orientation of a virtual microphone on an electronic device involves combining and processing signals from a microphone array to create the virtual microphone; determining, according to a predefined criterion, a use mode for the electronic device.

The use mode is one of a) a stowed use mode, in which the criterion is the electronic device being substantially enclosed by surrounding material; b) a handset (alternately, private) use mode, in which the criterion is the electronic device being held proximate to a user; and c) a handheld (alternately, speakerphone) use mode, in which the criterion is the electronic device being held away from a user.

In this embodiment, when the device is in the stowed use mode, the method further includes orienting the virtual microphone to be omnidirectional; when the device is in the handset use mode, adjusting the microphone array to beamform in a in direction normal to a longitudinal axis of the electronic device based on sensed input from a sensor of the electronic device; and, when the device is in the handheld use mode, adjusting the microphone array to beamform in a direction based on sensed input from one or more of the electronic device sensors. The mode of the device can be determined from sensor information or from an audio manager (whose state may be user-defined).

The term "electronic device" as used herein includes a variety of mobile and non-mobile devices. Examples of electronic devices include cell phones (including smart phones), headsets (e.g., a Bluetooth headset), digital media players, wearable devices, dedicated navigation devices, personal computers (e.g., tablets, laptops, notebooks, and netbooks), gaming devices, cameras, e-readers, dedicated navigation devices, and appliances.

FIG. 1 illustrates an exemplary electronic device 10 that includes a directional microphone array 12 and a plurality of sensors 20. The sensors 20 may include a 3D motion sensor 22 (e.g., accelerometer or velocity sensor), orientation sensor 24 (e.g., a gyroscope), Global Positioning System (GPS) module 26, one or more optical sensors 28 (e.g., cameras, visible light sensors, infrared sensors), and one or more proximity sensors 29. Other suitable sensors may be used as well, such as barometers, gravity sensors, rotational vector sensors, barometers, photometers, thermometers, and magnetometers.

The electronic device 10 also includes a processor 30. The processor 30 includes a memory 31 that stores data to be used by software modules. In many embodiments, the processor 30 is a signal processor.

The microphones of the array 12 detect sound and output audio signals representing the sound. The processor 30 receives the audio signals, combines and processes the signals to create a virtual microphone. The processor 30 receives data from one or more of the sensors 20 and determines, based on the received data, the mode in which the electronic device 10 is being used. Such data includes one or more of the following: the movement of the electronic device 10 in any of the three dimensions (received from the motion sensor 22); the physical orientation of the device 10 (received from the orientation sensor 24); the terrestrial coordinates of the device 10 (received from the GPS module 26); photos or moving images of what is near the device 10 (received from the one or more optical sensors 28); and the presence of nearby objects or users (received from the one or more proximity sensors 29).

In one embodiment, the one or more proximity sensors 29 are configured into a proximity sensor array. Having a proximity sensor array allows the processor 30 to determine the distance to, and direction of a desired sound source with more accuracy than with a single proximity sensor.

Based on the determined mode, the processor 30 directionally orients the virtual microphone. As noted previously, the microphones of the array 12 do not need to be physically moved. Instead, the processor 30 combines and processes the audio signals in such a way as to beam steer the sensitivity of the microphones in the appropriate direction. In this way, the electronic device 10 maintains an optimal configuration for the microphones of the microphone array 12 in order to keep the virtual microphone oriented along the most appropriate vector. This can improve device usage in many respects, including voice recognition. In addition to those elements illustrated in FIG. 1, the electronic device 10 may also include a permanent storage, a communications port for handling communications with external devices, and user interface devices. The software modules may be stored as program instructions or computer readable codes executable on the processor 30 on a computer-readable media such as read-only memory (ROM), random-access memory (RAM), and Digital Versatile Discs (DVDs).

As defined herein, a sensor (sometimes referred to as a detector) means any device that can sense and gather information about its environment. Possible types of information include the location in which the sensor is located, the status of the electronic device having the sensor included, and/or the spatial relationship between the electronic device and its user.

According to an embodiment, the processor 30 changes the orientation of the virtual microphone quickly (e.g., nearly instantaneous) in order to minimize observable/audible artifacts. To do so, it uses an efficient technique for detecting the direction of the desired source (e.g., a particular speaker). Alternatively, the processor 30 knows the direction of the search a priori.

In an embodiment, the electronic device 10 minimizes power consumption by turning off one or more of the optical sensors 28 when they are not needed. Additionally, the device 10 does not run face feature recognition software during periods during which that feature is not needed.

Mode Determination

The processor 30 uses data received from the sensors 20 to determine a current use mode (use situation) of the electronic device 10. Possible use modes include: 1) stowed use mode in which the device is located within a bag, pocket, briefcase, or other enclosure; 2) handset (or private) mode in which the user is holding the device close to his/her ear/head; and 3) speakerphone mode in which the device is located at some distance away from the user and the earphone speaker is relatively inaudible.

Stowed Use Mode

In order to determine if the electronic device 10 is in stowed mode, the processor 30 analyzes data it receives from one or more of the sensors 20. Examples of sensor information that may indicate a stowed use mode include (1) one or more of the optical sensors 28 (front, back, and other cameras or light sensors) detecting a low light level for more than a brief period of time; (2) the motion sensor 22 detecting motion consistent with being in a pants pocket or swinging in a handbag; and (3) the proximity sensor(s) 29 detecting multiple nearby surfaces. The processor 30 may consider any information indicating that the device 10 is within an enclosure.

In determining whether the device 10 is in a stowed use mode, the processor 30 may use data from multiple sensors. In one embodiment, the processor 30 applies weighting factors to the different pieces of sensor data. For example, data from the orientation sensor 24 may indicate that the electronic device 10 is upside down from its normal use orientation. Although not conclusive, such data could carry more weight than other pieces of data in suggesting a stowed use mode. The processor 30 would also analyze data from other sensors 20 to determine whether it corroborates the orientation sensor.

In another example of using multiple sensors, the processor 30 may analyze data from multiple optical sensors 28 and analyze the similarity of light observed among them. Similarly, the processor 30 can analyze data from multiple light sensors. Generally, the processor can use data from any combination of sensors, e.g., a combination of image data from the optical sensors 28, proximity data from the one or more proximity sensors 29, observed light data, etc.

If the processor 30 determines that the device 10 is in the stowed use mode, the processor 30 orients the virtual microphone so that it is not more or less sensitive in any particular direction. In other words, the processor 30 configures the virtual microphone to be omni-directional, as there may be no further information as to location of the user. In this situation, the overall gain of the microphone array 12 can be increased, the processor 30 can stop performing the tasks required for maintaining the virtual microphone, and/or the microphones of the array 12 can be turned off. The device 10 may take one or more of these actions based on a pre-programmed policy. Furthermore, the processor 30 can apply noise suppression algorithms that are appropriate for a stowed use mode. Alternatively, if the device 10 includes an omni-directional microphone, the signal processor 30 may turn off the directional microphones of the array 12, and solely use the omni-directional microphone.

Handheld (Speakerphone) Use Mode

FIG. 2 illustrates a device 10 being used in the handheld (speakerphone) use mode. There are two coordinate systems in FIG. 2—a Physical Coordinate System (PH CS), in which the device 10 itself is the reference point, and a World Coordinate System (WCS), in which the Earth is the reference point. In one embodiment, the processor 30 uses data from one or more proximity sensors 29 to determine if the device 10 is in the handheld mode. The processor 30 may analyze data from the proximity sensors 29 or the optical sensor 28 to determine whether a user's head is within a certain distance of the device 10.

Once the processor 30 determines that the device 10 meets the criteria for being in the handheld mode, the processor 30 determines the position and orientation of the device 10 relative to the WCS and relative to user's mouth 50 (the primary reference point) using data from the sensors 20. In one implementation, the processor 30 determines the primary reference point based on data from one or more of the cameras 28 or the one or more proximity sensors 29. In one embodiment, the one or more proximity sensors 29 are part of an array of proximity sensors. The use of a proximity sensor array enables the processor 30 to determine a more precise location of a desired talker in the handheld use mode. Having a more precise location allows the processor 30 to calculate a more accurate azimuth bearing. The processor 30 uses this azimuth bearing to orient the virtual microphone. Once an initial position is established, the processor 30 can use data it receives from the 3D motion sensor 22 and/or orientation sensor 24 to maintain the position and orientation of the device 10 with respect to the initial position (and hence, the mouth 50 of the user). In handheld mode, the approximate location of the desired speaker is known with accuracy of at least a hemisphere. The processor 30 can use this location data to orient the virtual microphone in that direction (see FIG. 2). Also, the processor 30 can use this information as initial estimate for a more elaborate search through space.

Referring to FIG. 2, when the device 10 is in a first position 10a, the virtual microphone is oriented along a first vector 14a so that it is nearly perpendicular to the face of the device 10 facing the mouth 50 of the user. The spatial geometry of the virtual microphone is illustrated by a cardioid pattern 40. As the device moves to a second position and orientation 10b, the movement is detected by one or more of the sensors 20 (e.g., the motion sensor 22 or orientation sensor 24). The processor 30 receives data from the one or more sensors indicating a change in position and, in response, reorients the virtual microphone to a second vector 14b.

If the user had moved and oriented the device 10 so that the microphone array 12 remained pointing towards the user's mouth 50, then the virtual microphone would have remained oriented nearly perpendicular to the primary face of the device facing the user. However, as illustrated in FIG. 2, the device 10 has been moved to the second position 10b, but its orientation has not changed. For this reason, the signal processor 30 needed to reorient the virtual microphone along a second vector 14b so that the virtual microphone would remain directed to the user's mouth 50. As illustrated, there is a significant angle between the second vector 14b and a line normal to the primary face of the device 10.

The processor 30 orients the virtual microphone based on data from the sensors 20 regarding the orientation of the device 10. In one example, the processor 30 orients the virtual microphone towards a location (or hemisphere) where desired talker (user's mouth) is. For example, if the device 10 is motionless and right side up with respect to the WCS, the virtual microphone is pointed up. If the device 10 is motionless and upside down (in the WCS) the processor 30 will orient the virtual microphone toward the back since the expected location of talker is in the back of the device 10. If the device is not motionless, then, based on the sensor 20 data, the processor 30 calculates device 10's orientation (pitch, yaw, roll) and calculates an orientation vector. The processor 30 then reorients the virtual microphone along the calculated vector. While the position of the electronic device 10 is being tracked, the processor 30 periodically re-calibrates the initial reference point based on data obtained from camera 28 and/or proximity sensor 29 (or proximity sensor array). By establishing the initial positional and orientation relationship between the user and the device in this mode, the processor 30 can consistently direct the virtual microphone towards the user's mouth 50 in order to achieve the goals discussed above.

According to another embodiment, when the device 10 is in handheld mode, the processor 30 orients the virtual microphone (i.e., steers the beam) at an angle relative to the horizontal plane (X-Z plane) of the WCS. In this embodiment, the processor 30 accounts for the tilting of the device 10 by the user about any axis by reorienting the virtual microphone relative to the device 10, and doing so in a way that keeps the virtual microphone oriented such that it maintains a constant angle with respect to the horizontal plane of the WCS. The angle between the virtual microphone and the horizontal plane can be any angle, including zero, and can be modified by the user in a preset stored in the electronic device 10. If, for example, the user tilts the top of the device 10 backward while the user was holding the device, the processor 30 would rotate the virtual microphone downward, i.e., in the Y direction about the X axis of the Ph CS in order to keep the virtual microphone at the same angle with respect to the horizontal plane of the WCS.

Handset (Private) Use Mode

FIGS. 3A-3C depict the electronic device 10 in the handset (also called "private") use mode. FIG. 3A and FIG. 3B show two views of a typical scenario, while FIG. 3C shows a less common scenario. To determine if the device 10 is in the handset mode, the processor 30 uses data from one or more of the sensors 20. If the device 10 is determined to be in the handset mode, the processor 30 calculates the vector from the microphone array 12 and the desired talker's mouth 50. The processor 30 then tries to keep the virtual microphone oriented along that vector.

The processor 30 can determine whether the electronic device 10 is in the handset use mode in a number of ways. For example, when one of the optical sensors 28 is implemented as a camera, it can be used to photograph an initial image of the environment. Using data received from the camera regarding the image, the processor 30 employs a facial feature recognition method to estimate (determine an approximate) distance between the device 10 and the face or facial feature (mouth 50, ear, or eye). If this distance is determined to be within a predefined threshold, then the processor 30 designates the device 10 as being in the handset use mode.

The processor 30 can also use the proximity sensors 29 to determine distance and direction to the desired talker. The determination will be more accurate if the proximity sensors 29 are configured as an array.

In the typical scenario of FIG. 3A and FIG. 3B, the device 10 is oriented so that its longitudinal axis AN will be at a known angle θN from a line normal to the horizontal plane of the WCS (line V). In this case, the virtual microphone of FIG. 3A can be oriented along a vector 15 that is normal to axis AN.

If, in the handset use mode, the device 10 changes from its typical orientation (FIG. 3A and FIG. 3B) to a non-typical orientation (FIG. 3C), the virtual microphone will need to be reoriented away from the initial position (i.e., away from where the mouth is expected to be in the typical use case).

For example, when the user angles the microphone portion of the device 10 closer to the ground, the device 10 moves from its typical position 11 (FIG. 3A and FIG. 3B) to a first non-typical position 11a. In the first non-typical position 11a, the primary axis A1 of the device 10 subtends a smaller angle $\theta_1$ than in the typical position. The processor 30 reacts to this change by reorienting the virtual microphone in an upward direction by changing its orientation vector from a first vector 15 to a second vector 15a. The purpose of this change is to ensure that the virtual microphone continues to point at the user's mouth 50.

When the user angles the microphone portion of the device higher from the ground the device 10 moves from its typical position 11 (FIG. 3A and FIG. 3B) to a second non-typical position 11b. In the second non-typical position 11b, the primary axis A2 of the device 10 subtends a larger angle $(180°-\theta_2)$ than in the typical position. The processor 30 reacts to this change by reorienting the virtual microphone in a downward direction by changing its orientation vector from a first vector 15 to a second vector 15b. Again, the purpose of this change is to ensure that the virtual microphone continues to point at the user's mouth 50.

In an embodiment, when the electronic device 10 is in the handset use mode, the beam steering algorithms (i.e., the algorithms that the processor 30 uses to reorient the virtual microphone) can be made much more efficient since the virtual microphone's orientation vector in the Ph CS is more likely to be within a bounded set of possible directions (i.e. rotated about and normal to Axis AN). As described with the previous mode, the processor 30 can use data from the sensors 20 to track the movement and change in orientation of the device 10 and reorient the virtual microphone (i.e., beam steer the array 12) accordingly. In one embodiment, an optical sensor 28 is camera. The accelerometer 22, the orientation sensor 24, and the proximity sensors 29, are used for tracking, but the camera is not, as it may consume a significant amount of power from the device 10.

In an alternative embodiment, where the array 12 is capable of being beam steered in three dimensions, the virtual microphone may be reoriented so that its orientation vector is steered towards the mouth reference point (MRP) in three dimensions as opposed to being constrained to being normal to axis AN. The MRP vector orientation is calculated from known human anatomy and known positions, orientation and dimensions of the device 10.

Smooth Beam Steering

As discussed previously, the processor 30 "orients" the virtual microphone by beam steering. In one embodiment, the beam steering can be performed in one of two ways. One way, which is illustrated in FIG. 4, is to select and activate omni-directional microphone pairs. In FIG. 4, there are three microphones A, B, C. Thus, there are three pairs possible: AB, AC, and BC. Combining and processing the signals from each omni-directional microphone pair creates directionality (gain) in a direction of a line connecting the two microphones. Thus, the gain direction θA-B, θA-C, and θB-C (respectively, for the pairs noted above) can be provided in a discrete switching and adjusting system.

Another way to beam steer is depicted in FIG. 5, in which the inputs from all three omni-directional microphones A, B, C are incorporated. The processor 30 processes the input signals in order to achieve precise control over the overall direction θCONT of the microphone array. In carrying out this processing, the processor 30 could use a weighted sum of the signals from the individual virtual microphones, or could adjust delay functions or delay coefficients of two microphones from the third. These can be adjusted in a smooth fashion as a function of the desired direction.

An advantage of the second technique over the first is that, using the first beam steering technique, the directionality is limited to discrete directions obtained by switching only. Using the second technique steers the beam continuously and smoothly, with exceptionally fine precision.

Control over directionality can be achieved with as few as three non-collinear microphones. Any number of microphones could be used to achieve precise directional and/or gain characteristics, however. Furthermore, if a fourth microphone is added that is non-planar with the other three, movement in three dimensions can be achieved.

In various embodiments, the processor 30 receives data from the sensors 20, uses this data to make a decision about the orientation of the device 10 and the location (and therefore a direction of arrival) of the desired speech source. Once the processor establishes a hypothesis about the direction(s) of arrival of desired sound source, it configures the virtual microphone in accordance with the hypothesis. The processor carries this out by selecting which of the available microphones to activate, and how to combine their signals so as to obtain optimal virtual microphone configuration.

The processor 30 can carry out additional processing on the signals from the sensors 20. For example, the processor 30 can de-noise, threshold, or otherwise condition the signals in order to aid the processor in making the correct decision. For example the signal from the orientation sensor 24 may need to be filtered or long-term averaged in order to obtain stable vector information about the position of the device in space. Images from the optical sensors 28 may need to be processed to obtain basic information from them, such as how much light there is, and how consistent the detected light level is among multiple optical sensors. The processor 30 may also need to carry out more complex processing, such as correlating the lack of movement of the images on multiple optical sensors.

Turning to FIG. 6, a system component block diagram illustrates a general flow of processing in the device 10 according to an embodiment of the disclosure. As can be seen in FIG. 6, the sensors 20 are used to establish position/orientation of the device 10 via a portable orientation processor 32. This can be a part of the processor 30, incorporating program instructions to perform the orientation determination, or it could be a separate dedicated processor. The microphone configuration unit 34 uses the position/orientation information in combination with the use case/mode determined for the device by the audio manager 36. The orientation vector of the virtual microphone can be continuously adjusted according to the microphone selection switch 13 and in the manner described above. Signal conditioning components 38, such as filtering and the like, can be applied to the signal received from the microphone array 38, and these conditioned signals can be provided to a voice recognition engine 39 or simply as enhanced audio input for the device.

FIG. 7 is a flowchart that illustrates a basic flow of operations described above according to one embodiment. Although the flowchart shows the steps as occurring in a particular order, the steps do not necessarily have to be performed in this order.

As shown, the electronic device receives sensor input (S100), and may optionally perform conditioning (S102) on the sensor input signals received. With this sensor input, the device determines a use mode (S104). If the use mode is determined to be a stowed use mode, the microphone array is set to omnidirectional (S106) (alternatively S106 could be the deactivation of audio capture in the stowed mode), and the device performs subsequent post processing of the audio input (S114).

If the use mode is determined to be a handheld use mode, then the device adjusts the virtual microphone based on some form of sensed input (S108). Then, the device continuously adjusts the orientation vector of the virtual microphone based on sensor input (S112). The device then performs the subsequent post processing (S114). Finally, if the use mode is a handset mode, then the orientation vector of the virtual microphone is set to a predefined handset mode vector use direction (S110). The virtual microphone is continuously reoriented based on sensor input (S112) (although the algorithms may be different for the handset and the handheld mode). The device then further post processes the audio input (S114). This algorithm is repeatedly executed so that the correct mode is operative and the device uses the best way of adjusting the virtual microphone (beam steering the microphone array) in various situations.

It can be seen from the foregoing that a method and apparatus for detecting and controlling microphone array orientation has been provided.

A "module" as used herein is software executing on hardware. A module may execute on multiple hardware elements or on a single one. Furthermore, when multiple modules are depicted in the figures, it is to be understood that the modules may, in fact, all be executing on the same device and in the same overall unit of software.

When the current disclosure refers to sensors, modules, and other elements "providing" data or information to a processor, or the processor "receiving" data or information from them, t is to be understood that there are a variety of possible ways such an action may be carried out, including electrical signals being transmitted along conductive paths (e.g., wires) and inter-object method calls.

For the purposes of promoting an understanding of the principles of the disclosure, reference has been made to the preferred embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the disclosure could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The use of the terms "a" and "an" and "the" and similar referents in the context of describing the disclosure (especially in the context of the following claims) should be construed to cover both the singular and the plural.

Finally, the use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those skilled in this art without departing from the spirit and scope of the disclosure.

What is claimed is:

1. An electronic device comprising:
    a microphone array comprising a plurality of microphones;
    a sensor; and
    a processor configured to:
        combine and process signals from the microphone array to create a virtual microphone;
        determine a use mode of the electronic device;
        based on output of the sensor, determine an orientation of the electronic device relative to an orientation of a head of a user; and
        adjust an orientation of the virtual microphone based on the determined use mode and on the orientation of the electronic device relative to the orientation of the head of the user.

2. The electronic device of claim 1, wherein:
    the sensor is a motion-detecting sensor that detects an orientation motion of the electronic device relative to the user head orientation from a first orientation to a second orientation; and
    the processor adjusts the orientation of the virtual microphone by beamforming the microphone array in a direction normal to a longitudinal axis of the electronic device throughout the motion from the first orientation to the second orientation.

3. The electronic device of claim 2, wherein microphone array further comprises:
    a first pair and a second pair of microphones, each having respective outputs, wherein the first pair and the second pair of microphones comprise at least three planar microphones of the microphone array;

the processor is further configured to:
combine the first microphone pair output and the second microphone pair output such that the orientation of the microphone array is in a direction normal to a longitudinal axis of the electronic device.

4. The electronic device of claim 1, wherein the processor comprises:
a signal conditioning component having an input that is connected to an output of the microphone array.

5. The electronic device of claim 4, further comprising:
a speech recognition engine that receives conditioned signals from the signal conditioning component.

6. The electronic device of claim 1, wherein the sensor is selected from the group consisting of a proximity sensor, a motion sensor, an optical sensor, and an orientation sensor.

7. The electronic device of claim 1, wherein:
the sensor comprises an orientation sensor that detects a real world coordinate orientation of the electronic device,
wherein when the electronic device is in a handheld use mode, the microphone array uses the orientation sensor to adjust the microphone array orientation to be a direction normal to a longitudinal axis of the electronic device.

8. A method for controlling orientation of a virtual microphone on an electronic device, the method comprising:
combining and processing signals from a microphone array to create the virtual microphone;
determining, according to a predefined criterion, a use mode for the electronic device, the use mode being selected from the group consisting of:
a) a stowed use mode, in which the criterion is the electronic device being substantially enclosed by surrounding material,
b) a handset use mode, in which the criterion is the electronic device being held proximate to a user, and
c) a handheld use mode in which the criterion is the electronic device being held away from a user,
when the device is in the stowed use mode, adjusting the virtual microphone to be omnidirectional;
when the device is in the handset use mode, adjusting the virtual microphone by beamforming the microphone array in a direction normal to a longitudinal axis of the electronic device based on sensed input from a sensor of the electronic device; and
when the device is in the handheld use mode, adjusting the virtual microphone by beamforming the array in a direction based on sensed input from a sensor of the electronic device.

9. The method of claim 8, wherein continuously combining and processing audio signals from a microphone array comprises:
activating a first pair and a second pair of microphones from the microphone array, wherein the first pair and the second pair of microphones comprise at least three planar microphones of the microphone array;
combining a first microphone pair output and a second microphone pair output such that the microphones of the microphone array beamform in a direction normal to a longitudinal axis of the electronic device;
signal conditioning the first microphone pair output and the second microphone pair output; and
providing the signal-conditioned outputs to a speech recognition engine.

10. The method of claim 8, wherein the sensor is selected from a group consisting of a proximity sensor, a motion sensor, an optical sensor, and an orientation sensor.

11. A method for controlling the orientation of a virtual microphone on an electronic device, the method comprising:
combining and processing signals from a microphone array to create the virtual microphone;
receiving real world coordinate orientation data from a sensor of the electronic device;
determining, based on the real world coordinate orientation data, that the electronic device is being used in a handheld use mode; and
based on determining that the electronic device is being used in the handheld use mode, directionally orienting the virtual microphone by beamforming microphones of the microphone array at an angle relative to an earth horizon based on the real world coordinate orientation data.

12. The method of claim 11, comprising:
determining that the electronic device is being used in a stowed use mode; and
orienting the virtual microphone to be omnidirectional.

13. The method of claim 11, comprising:
receiving orientation data from an orientation sensor;
determining that the electronic device is being used in a handset use mode;
detecting, with the orientation sensor, a motion of the electronic device relative to a user's head from a first orientation to a second orientation; and
continuously combining and processing audio signals from the microphone array to beamform in a direction normal to a longitudinal axis of the electronic device throughout the motion from the first orientation to the second orientation.

14. The method of claim 13, wherein continuously combining and processing audio signals from the plurality of microphones comprises:
activating a first pair and a second pair of microphones from the microphone array, wherein the first pair and the second pair of microphones comprise at least three planar microphones of the microphone array; and
combining a first microphone pair output and a second microphone pair output such that the microphones of the microphone array beamform in a direction normal to a longitudinal axis of the electronic device.

15. The method of claim 14, further comprising:
signal conditioning the first microphone pair output and the second microphone pair output; and
providing the signal-conditioned outputs to a speech recognition engine.

16. The method of claim 11, wherein the sensor is selected from a group consisting of a proximity sensor, a motion sensor, an optical sensor, and an orientation sensor.

17. The method of claim 11, comprising:
receiving real world coordinate orientation data from the sensor;
determining that the electronic device is being used in a handheld use mode; and
beamforming the microphones of the microphone array at an angle relative to an earth horizon based on the real world coordinate orientation data,
wherein the angle is user-configurable.

18. The method of claim 11, comprising:
determining that the electronic device is being used in a stowed use mode; and
turning off the microphones of the microphone array.

* * * * *

UNITED STATES PATENT AND TRADEMARK OFFICE
CERTIFICATE OF CORRECTION

| | | |
|---|---|---|
| PATENT NO. | : | 9,462,379 B2 |
| APPLICATION NO. | : | 13/946150 |
| DATED | : | October 4, 2016 |
| INVENTOR(S) | : | Ivanov et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Twenty-fifth Day of September, 2018

Andrei Iancu
*Director of the United States Patent and Trademark Office*